Patented Sept. 26, 1922.

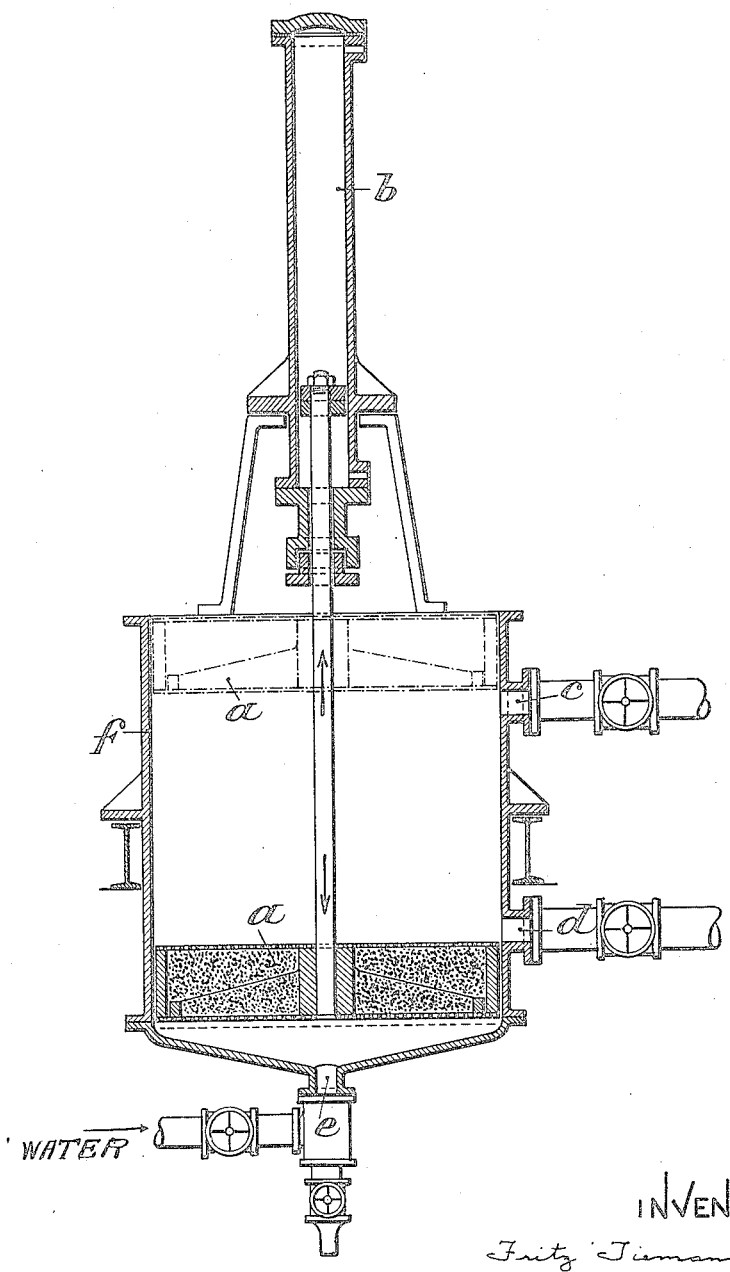

1,430,200

UNITED STATES PATENT OFFICE.

FRITZ TIEMANN, OF BERLIN-WILMERSDORF, GERMANY.

PROCESS FOR PURIFYING SUGAR JUICES BY FILTRATION AND DECANTATION.

Application filed July 6, 1921. Serial No. 482,781.

(GRANTED UNDER THE PROVISIONS OF THE ACT OF MARCH 3, 1921, 41 STAT. L., 1313.)

*To all whom it may concern:*

Be it known that I, FRITZ TIEMANN, engineer, a citizen of Germany, residing at Berlin-Wilmersdorf, Germany, 36 Laubacherstrasse, have invented certain new and useful Improvements in Processes for Purifying Sugar Juices by Filtration and Decantation (for which I have filed applications in Germany, April 21st, 1920, Patent No. ———; Germany, December 16th, 1920, Patent No. ———; Germany, December 21st, 1920, Patent No. ———; France, April 20th, 1921, Patent No. ———; Italy, April 20th, 1921, Patent No. ———; Great Britain, April 21st, 1921, Patent No. 161987; Netherlands, April 21st, 1921, Patent No. ———; Czecho-Slovak Republic, April 21st, 1921, Patent No. ———; Belgium, April 28th, 1921, Patent No.———), of which the following is a specification.

The invention relates to purifying sugar juices by filtration and decantation and consists essentially in a process in which the filter particles are arranged in a basket or frame moved downwardly through the stationary fluid and in which after removal of the sugar juice lying over the filter, the juice in the sediment deposited in the filter vessel is taken out, after which by quickly raising the filter the sediment adhering to its lower surface and that forced into it are removed.

This process has the advantage as compared to the known processes that the treatment of the juice and of the sediment is carried out in a single operation and in the same apparatus, so that a considerable economy in first cost and apparatus is effected.

Filters are known in which filtration of water for house consumption or the like is effected by a piston shaped member fitting within the container for the water, so that when the container is raised the water in it is drawn through the filtering material. A process is also known for filtering water extractions and other fluids in which the filter material arranged in a basket or frame is moved up and down through the stationary fluid. These processes or devices which are arranged for other purposes are not applicable to the sugar industry.

A diagrammatic representation of a decantation filter suitable for carrying out the process according to the invention is shown in section in the accompanying drawing.

The filter materials which are moved through the juices to be filtered are arranged in a container $a$ which can be moved up and down in a cylindrical vessel $f$, leakage between the container and the walls of the cylinder being prevented in known manner, for example, by means of a number of grooves with a suitable insertion of felt or hemp.

The descent of the filter $a$ is controlled by a hydraulic cylinder $b$, but any other mechanical device such as a worm drive, a screwed spindle or the like is suitable for this purpose. The juice is admitted through openings $c$ into the vessel $f$ when the filter $a$ is in its highest position, as shown in dotted lines, and the filter is then allowed to descend slowly through the stationary liquid, so that for granular materials not likely to form in layers the rate of fall is, for example, about .7 mm. per second.

The rate of fall of the filter $a$ is exactly adjusted and controlled by allowing the water to flow from below the piston of the hydraulic lifting device $b$.

At the end of the descent of the filter $a$ which, in dependence on the amount of the sediment, is somewhat above the base of the vessel $f$, the filtered juice standing over the filter is allowed to escape through an opening $d$, while the filter $a$ is in its lowest position.

Extraction of juice by decantation from the sediment has not formerly been possible in consequence of the colloidal and slimy nature of the sediment. In the present method, however, at the end of the filter process the juices are pressed both out of the filter material and also out of the pulpy sediment by lowering the piston to the extremity of its stroke. The pulp is maintained for this purpose in a wet state by means of cold or hot water which is introduced from the bottom of the vessel so as to rise gradually and percolate through the precipitate in the bottom of the chamber and through the filter while it is in this extreme position. As the water and extracted juice rise through the filter, they flow out through the opening $d$.

At the end of the filtration or extraction, after the opening $d$ has been closed, the filter is raised by means of the hydraulic cylinder $b$ at a high speed, for example 100 mm. per second, in order to cleanse the filtering material from the small impurities and sediment clinging to the lower part of the filter. On closing the lower opening $e$, any fluid in the filter material or water forced in, is drawn out by the air which streams in at the upper part at a high velocity, so that the filtrate is forced downwards and removed. During the further ascent of the filter $a$ to its original position, the filter particles are completely dried by the air which is drawn in. The sediment is removed in a pulpy condition through the opening $e$ in the base, whereupon, after this opening is closed the filter is again ready for the operation to be repeated.

The filter can be cleansed from time to time by water admitted into the vessel $f$ over the filter, which is raised through the water quickly by means of the hydraulic cylinder $b$. In this way the wash water, which fills only a portion of the container $f$, is pressed by atmospheric pressure through the filter material, since the container is sealed substantially air tight under the filter.

In order that the process should act efficiently it is advisable to limit the pressure exerted by the filter particles on the sediment, so that, on the one hand, the filter particles shall not be soiled, or, on the other hand, the permeability of the slime should not be reduced during the extraction of the juice.

In the described decantation filter in the basket or frame mentioned therein, which is the carrier of the filtering means, filtering material of granular loosely deposited form is chosen instead of rigid filtering material suitable to be also applied, as for instance webbing of any kind of textile and metallic nature.

As is well known the pressing out of any kind of slime, particularly of decantation slime from sugar juices of any description is entirely impossible, as soon as the proportion of the cubic contents of the slime to the filtering surfaces, in the present instance the bottoms of the frames, is too large.

For carrying through the extraction of juice from slime any high pressure ought to be avoided. But this cannot always be avoided nor the pressure kept uniform in consequence of the varying quantity of sediments and the changing purity of the juices, since the stroke of the filtering device is adjusted to a certain predetermined output.

As a result, when such quantities of impurities are present large quantities of slime will frequently enter the lower portion of the loosely deposited filtering material. For instance, sand may accumulate within the filtering material in such quantities that it cannot readily be removed by abruptly raising the filter, as is commonly done, even though the container is filled with rinsing water.

This drawback will be overcome by providing not a rigid lower sieve bottom, serving as a support for the filtering material, but an elastic or swinging one, so that when lifting the filtering device the sand will be agitated in the liquid which it contains, or in the rnsing water admitted, and will more readily be expelled from the filtering material.

By this arrangement even heavier soilings and slime masses are easily removed or washed out.

A construction of the vibrating sieve bottom from flexible metal cloth has proved especially advantageous, the latter being supported elastically by means of thin piano wires extending radially beneath the sieve bottom.

The lowering of the body of filter material through the stationary juices may be accomplished in such manner that the filter at all times passes through a portion of the liquid body which has already been initially purified by allowing impurities to settle out. This may be accomplished by merely filling the reservoir with impure juice and allowing it to settle for a considerable length of time before the downward movement of the filter is begun. By this means, a large proportion of the sediment is allowed to settle to the bottom of the container and the filter need only serve to remove those impurities which have not yet settled out. This process may be carried out by lowering the filter through the juice at a uniform rate.

In certain cases it is more advantageous to effect the downward movement periodically instead of constantly. In this case the filtering material is started to move immediately after admission of the juices, no time being allowed for settling and such momement being subject to periodic interruptions.

By this intermittent operation, the sediments are caused to accumulate at the lower filtering surface during the movement, to sink down while the movement of the filtering material is interrupted, and thus to settle more quickly to the bottom of the apparatus.

In this process the descent of the accumulated sediment is materially enhanced if, after each periodic downward movement of the filter, it is drawn upward an amount less than the distance traversed during its downward movement. It is advisable also to effect such upward movement at a low velocity.

By this arrangement the dropping off of the accumulated sediments, even those of particularly slimy nature, will be prevented by the small back flow of the filtered juices.

It may be observed that by means of this intermittent movement the descent of the filtering material may be effected much quicker so that the efficiency of an installation will be essentially increased. Besides, the accumulated flakes of sediment during their descent effect a much better cleaning by carrying along particles held in suspension in the juices, than if the sediments are precipitated according to their specific sinking speed.

By reason of the fact that the filter material is in no danger of becoming clogged up with impurities in carrying out this process, as is the case in ordinary types of apparatus of this character, it is preferable to construct the filter of webbing or similar material.

Furthermore the filtration of the lower slime juices as well as an intended lixiviation of the sediments is favorably furthered in this method of working to the slight kneading effect on the sediments while admitting the displacement water below.

Such periodical descent of the filtering material and the reversal thereof, can be effected by means of the arrangement described and mechanically regulated in an easy and simple manner without jolting or knocking.

I claim:

1. A method for purifying sugar juices by filtration and decantation, comprising moving a body of filtering material through the stationery juices and squeezing out the juice contained in the sediment accumulated beneath the filter, removing the filtered juice left in the wake of said moving filter, and abruptly returning the filtering material at a relatively high velocity for removing the sediment accumulated within the filter and upon its lower surface.

2. A method for purifying sugar juices by filtration and decantation, comprising moving a body of filtering material through the stationary juices and squeezing out the juices contained in the sediment accumulated beneath the filter, removing the filtered juice left in the wake of said moving filter, admitting water into the space above said filter, and abruptly returning the filtering material at a relatively high velocity for removing the sediment accumulated within the filter and upon its lower surface.

3. Method of purifying sugar juices by filtration and decantation, comprising moving a body of filtering material consisting of loosely arranged granular particles resting upon elastic bottom supports through the stationary sugar juices and squeezing out the juice contained in the sediment accumulated beneath the filter, removing the filtered juice left in the wake of such moving filter, and abruptly returning the filtering material at a relatively high velocity for removing the sediment accumulated within the filter and upon its lower surface.

4. A method for purifying sugar juices by filtration and decantation, comprising moving a body of filtering material through the stationary juices and squeezing out the juice contained in the sediment accumulated beneath the filter, removing the filtered juice left in the wake of said moving filter, and abruptly returning the filtering material at a relatively high velocity for removing the sediment accumulated within the filter and upon its lower surface, the movement of the filtered material being alternately downward and upward, said downward movement covering a distance and occupying a time different from said upward movement.

In testimony whereof I have affixed my signature in presence of two witnesses.

FRITZ TIEMANN.

Witnesses:
MAX WAGNER,
PAUL MASCOW.